(12) United States Patent
Han et al.

(10) Patent No.: US 9,170,694 B2
(45) Date of Patent: Oct. 27, 2015

(54) TOUCH SENSOR INTEGRATED TYPE DISPLAY DEVICE

(71) Applicant: LG DISPLAY CO., LTD., Seoul (KR)

(72) Inventors: Manhyeop Han, Seoul (KR); Cheolse Kim, Dalseo-gu (KR)

(73) Assignee: LG DISPLAY CO., LTD., Seoul (KR)

( * ) Notice: Subject to any disclaimer, the term of this patent is extended or adjusted under 35 U.S.C. 154(b) by 85 days.

(21) Appl. No.: 14/104,340

(22) Filed: Dec. 12, 2013

(65) Prior Publication Data

US 2014/0184559 A1    Jul. 3, 2014

(30) Foreign Application Priority Data

Dec. 27, 2012    (KR) .................. 10-2012-0155128

(51) Int. Cl.
| | | |
|---|---|---|
| G06F 3/045 | (2006.01) | |
| G06F 3/044 | (2006.01) | |
| G06F 3/041 | (2006.01) | |
| G02F 1/1343 | (2006.01) | |

(52) U.S. Cl.
CPC .............. *G06F 3/044* (2013.01); *G06F 3/0412* (2013.01); *G02F 2001/134318* (2013.01); *G06F 2203/04103* (2013.01)

(58) Field of Classification Search
CPC .................. G06F 3/0412; G06F 3/044; G06F 2203/04103; G02F 2001/134318
See application file for complete search history.

(56) References Cited

U.S. PATENT DOCUMENTS

| | | | |
|---|---|---|---|
| 2011/0062969 A1* | 3/2011 | Hargreaves et al. .......... | 324/658 |
| 2012/0086665 A1* | 4/2012 | Song ............................ | 345/174 |
| 2012/0162089 A1* | 6/2012 | Chang ........................... | 345/173 |
| 2013/0265282 A1* | 10/2013 | Nakagawa et al. ........... | 345/174 |
| 2014/0084992 A1* | 3/2014 | Chen et al. .................... | 327/517 |
| 2014/0152615 A1* | 6/2014 | Chang et al. ................. | 345/174 |

* cited by examiner

*Primary Examiner* — Lixi C Simpson
(74) *Attorney, Agent, or Firm* — Dentons US LLP (57) ABSTRACT

Disclosed is a touch sensor integrated type display device, that includes a plurality of gate lines and data lines which cross each other and form a plurality of pixel areas, a plurality of first electrodes arranged in parallel with one another in a first direction, a plurality of second electrodes which are formed on the same layer as the first electrodes and are arranged in parallel with one another in the first direction and a second direction crossing the first direction, and a plurality of pixel electrodes which are formed on a layer different from the first and second electrodes in the pixel areas and are positioned opposite the first and second electrodes. The first electrodes and the second electrodes arranged in parallel with one another in the first direction are alternately disposed every m electrode lines, where m is a natural number.

8 Claims, 9 Drawing Sheets

TOUCH SENSOR INTEGRATED TYPE DISPLAY DEVICE

CROSS-REFERENCE TO RELATED APPLICATIONS

This application claims the benefit of priority under 35 U.S.C. §119(a) to Korea Patent Application No. 10-2012-0155128 filed on Dec. 27, 2012, which is incorporated herein by reference for all purposes as if fully set forth herein.

BACKGROUND OF THE INVENTION

1. Field of the Invention

Embodiments of the invention relate to a touch sensor integrated type display device capable of recognizing a user's touch operation. More particularly, the present invention relates to a touch sensor integrated type display device capable of implementing an in-cell touch sensor through a simple pixel configuration and enhancing touch sensitivity.

2. Discussion of the Related Art

In recent years, various input devices such as a keyboard, a mouse, a joystick, and a digitizer have been used to allow users to interface with home appliances or information telecommunication devices. However, when the user makes use of these input devices, user's dissatisfaction increases because the user is required to learn how to use the input devices and the input devices occupy space. Therefore, a convenient and simple input device that can reduce erroneous operation is required. In response to this demand, a touch sensor for enabling the user to input information by directly touching the screen with his or her hand or a pen was suggested.

The touch sensor has a simple configuration capable of reducing erroneous operations. The user can also perform an input action without using a separate input device, and can quickly and easily manipulate a device through contents displayed on the screen. Accordingly, the touch sensor has been applied to various display devices.

The touch sensor used in the display devices may be classified into an add-on type touch sensor and an on-cell type touch sensor. The add-on type touch sensor is configured such that a display device and a touch sensor are individually manufactured and then the touch sensor is attached to an upper substrate of the display device. The on-cell type touch sensor is configured such that components constituting a touch sensor are directly formed on the surface of the upper glass substrate of the display device.

There is a problem that a thickness of the display device increases because the add-on type touch sensor has the structure in which the touch sensor is mounted on the display device. Further, the visibility of the display device is reduced because of a reduction in brightness of the display device due to the increased thickness.

On the other hand, the on-cell type touch sensor shares the glass substrate with the display device because the touch sensor has the structure in which the touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor.

Accordingly, a touch sensor integrated type display device capable of using touch driving electrodes and touch sensing electrodes of a touch sensor as a common electrode of the display device was devised, so as to solve the above-described problem.

However, because the related art touch sensor integrated type display device has to divide the common electrode of the display device to form the touch driving electrodes and the touch sensing electrodes on a single layer, various types of display pixels, separate wires for connecting the touch driving electrodes to the touch sensing electrodes, and contact holes are complicatedly formed in a unit pattern of the touch electrode. To implement the touch sensor in such a complicated structure of the display device, various kinds of display unit pixels have to be combined to form a touch unit pattern composed of several hundreds to several thousands of display unit pixels.

In this instance, complicated configuration of the display pixels results in a reduction in display characteristics, and it is difficult to perform a process for the complicated configuration of the touch sensor and the touch unit pattern and to conduct an image test.

SUMMARY OF THE INVENTION

Embodiments of the invention provide a touch sensor integrated type display device capable of maximizing a difference between mutual capacitances before and after a touch operation and improving a touch performance by connecting touch driving electrodes and touch sensing electrodes to common electrodes of the same number of display pixels and alternately disposing the touch driving electrodes and the touch sensing electrodes to thereby form touch unit patterns for a touch sensing operation and also capable of configuring regularly and simply the display pixels.

In one aspect, there is a touch sensor integrated type display device comprising a plurality of gate lines and a plurality of data lines configured to cross over each other and form a plurality of pixel areas, a plurality of first electrodes arranged in parallel with one another in a first direction, a plurality of second electrodes which are formed on the same layer as the plurality of first electrodes and are arranged in parallel with one another in the first direction and a second direction crossing the first direction, and a plurality of pixel electrodes which are formed on a layer different from the plurality of first and second electrodes in the plurality of pixel areas and are positioned opposite the plurality of first and second electrodes, wherein the plurality of first electrodes and the plurality of second electrodes arranged in parallel with one another in the first direction are alternately disposed every m electrode lines, where m is a natural number.

Each of the plurality of first electrodes is formed to correspond to the pixel electrodes corresponding to one line arranged in the first direction. The plurality of second electrodes arranged in parallel with one another in the first direction are formed to correspond to the pixel electrodes corresponding to one line arranged in the first direction.

The touch sensor integrated type display device further comprises at least one first electrode resistance reducing wire which overlaps the first electrode along a direction of the first electrode and reduces a resistance of the first electrode, and at least one second electrode resistance reducing wire which are formed on each of the plurality of second electrodes to cross the plurality of second electrodes arranged in parallel with one another in the second direction, connects the second electrodes belonging to each of columns of the plurality of second electrodes arranged in parallel with one another in the second direction, and reduces a resistance of the second electrode.

The plurality of first electrodes serve as both a common electrode and touch driving electrodes, and the plurality of second electrodes serve as both a common electrode and touch sensing electrodes. Alternatively, the plurality of first electrodes serve as both a common electrode and touch sensing electrodes, and the plurality of second electrodes serve as both a common electrode and touch driving electrodes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. In the following description, a touch sensor integrated type liquid crystal display is used as an example of a touch sensor integrated type display device.

Figure 1:
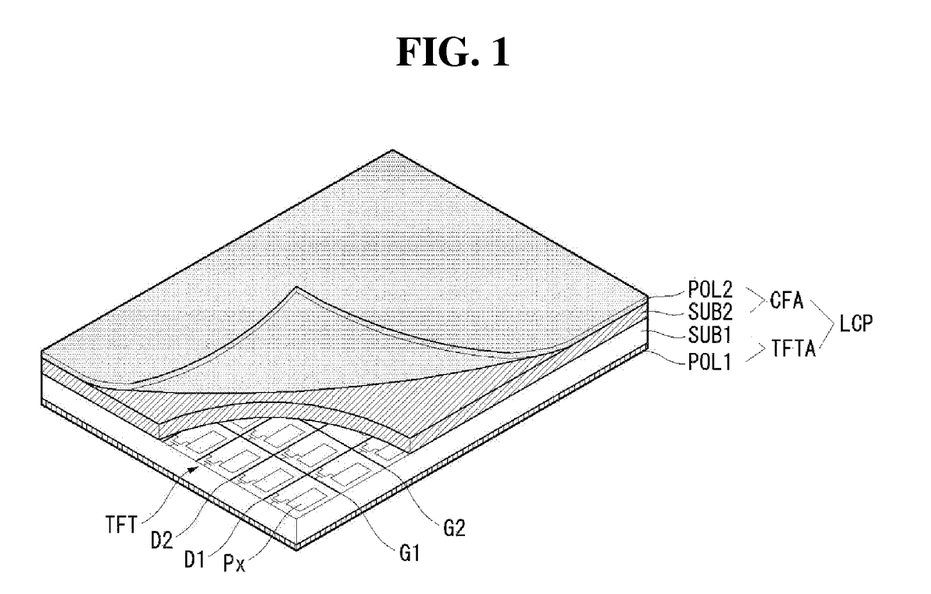
FIG. 1 is a partial exploded perspective view schematically showing a touch sensor integrated type display device according to an exemplary embodiment of the invention.
Figure 2:
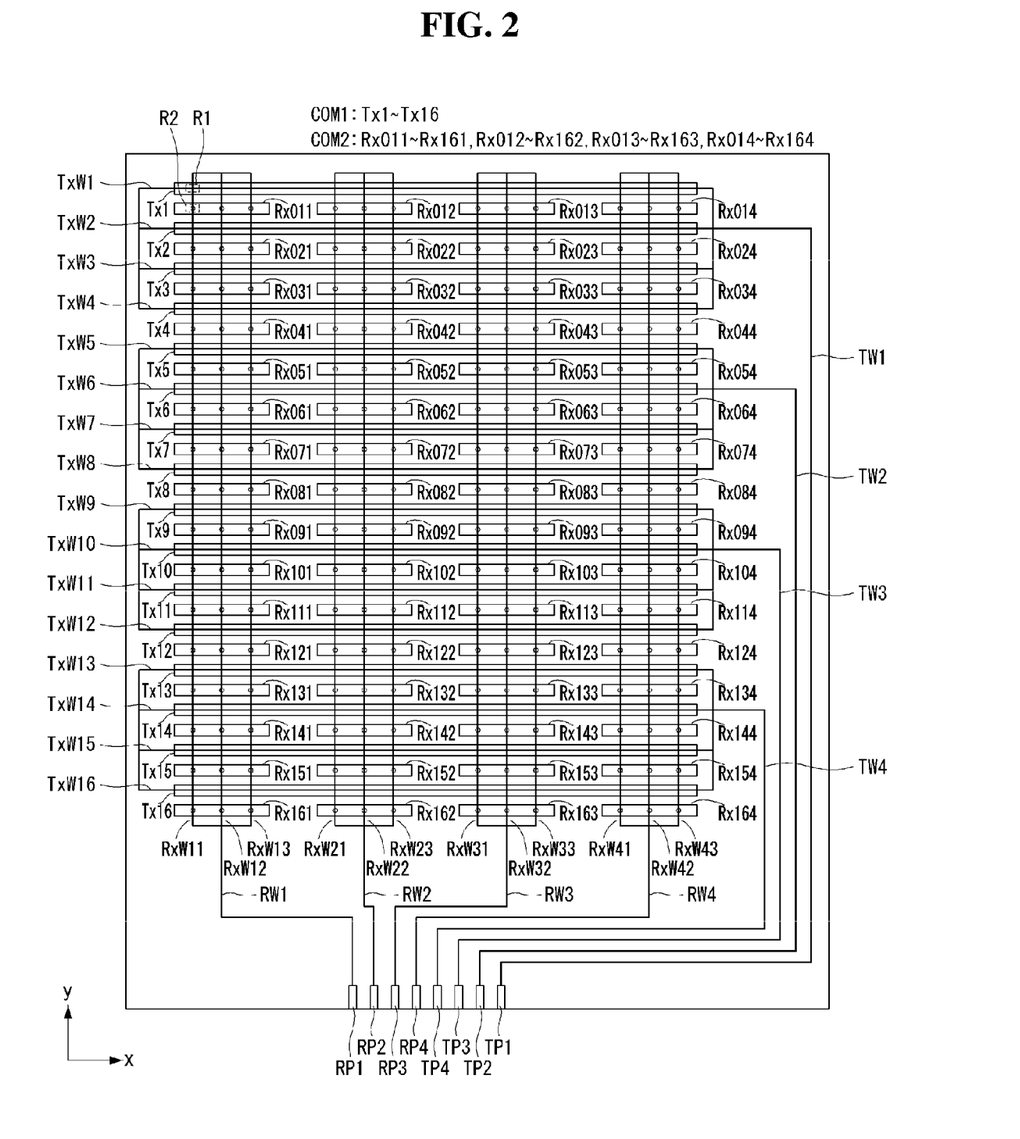
FIG. 2 is a plane view showing a relationship between touch driving electrodes and touch sensing electrodes serving as a common electrode in a touch sensor integrated type display device according to a first embodiment of the invention.

A touch sensor integrated type display device according to a first embodiment of the invention is described in detail with reference to FIGS. 1 and 2. FIG. 1 is a partial exploded perspective view schematically showing a touch sensor integrated type display device according to an exemplary embodiment of the invention. FIG. 2 is a plane view showing a relationship between touch driving electrodes and touch sensing electrodes serving as a common electrode in a touch sensor integrated type display device according to a first embodiment of the invention.

As shown in FIG. 1, a touch sensor integrated type display device commonly applicable to embodiments of the invention includes a liquid crystal display panel LCP including a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel on a first substrate SUB1 in a first direction (for example, x-axis direction), a plurality of data lines D1 and D2 which are formed in parallel in a second direction (for example, y-axis direction) to cross over the plurality of gate lines G1 and G2, thin film transistors TFT formed at crossings of the gate lines G1 and G2 and the data lines D1 and D2, a plurality of pixel electrodes Px for charging liquid crystal cells to a data voltage, and a plurality of common electrodes (not shown) positioned opposite the plurality of pixel electrodes Px.

The color filter array CFA includes black matrixes (not shown) and color filters (not shown), which are formed on a second substrate SUB2. Polarizing plates POL1 and POL2 are respectively attached to outer surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and the second substrate SUBS2 to maintain cell gaps of the liquid crystal cells.

The common electrodes are formed on the second substrate SUB2 in a vertical electric field driving manner such as a twisted nematic (TN) mode and a vertical alignment (VA) mode. Further, the common electrodes are formed on the first substrate SUB1 along with the pixel electrodes Px in a horizontal electric field driving manner such as an in-plane switching (IPS) mode and a fringe field switching (FFS) mode. In the embodiment of the invention, the common electrodes in the horizontal electric field driving manner are described as an example.

Referring to FIG. 2, the common electrode according to the first embodiment of the invention is divided into the plurality of common electrodes and serves as touch driving electrodes and touch sensing electrodes. Thus, in the following description, the common electrode is referred to as the common electrode serving as the touch driving electrode, the common electrode serving as the touch sensing electrode, the touch driving electrode, the touch sensing electrode, the touch driving electrode serving as the common electrode, or the touch sensing electrode serving as the common electrode, if necessary or desired.

The touch sensor integrated type display device according to the first embodiment of the invention is described using a display pixel including 32 unit pixel electrodes in the x-axis direction and 32 unit pixel electrodes in the y-axis direction as an example.

As shown in FIG. 2, the common electrode of the touch sensor integrated type display device according to the first embodiment of the invention is divided in the first direction (for example, x-axis direction) and the second direction (for example, y-axis direction). More specifically, the common electrode is divided in the x-axis and y-axis directions to include a plurality of first common electrodes COM1 arranged along the y-axis direction and a plurality of second common electrodes COM2 arranged along the x-axis and y-axis directions.

The first common electrodes COM1 serve as touch driving electrodes of touch sensors and form a plurality of touch driving lines in the x-axis direction. The touch driving lines defined by the first common electrodes COM1 are formed in parallel with one another so as to form a plurality of rows. Hereinafter, the touch driving lines are referred to as first to sixteenth touch driving electrodes Tx1 to Tx16. Each of the first to sixteenth touch driving electrodes Tx1 to Tx16 is formed so that it corresponds to 32 unit pixel electrodes.

The second common electrodes COM2 serve as touch sensing electrodes of the touch sensors and form a plurality of touch sensing lines in the y-axis direction. The touch sensing lines defined by the second common electrodes COM2 are divided in the x-axis and y-axis directions so that the touch sensing lines are formed in the y-axis direction, and thus are formed in parallel with one another so as to form the rows and the columns. Thus, the second common electrodes COM2 are divided in both the x-axis direction (i.e., row direction) and the y-axis direction (i.e., column direction). Hence, the second common electrodes COM2 of the row direction include touch sensing electrodes Rx011-Rx014, Rx021-Rx024, Rx031-Rx034, Rx041-Rx044, Rx051-Rx054, Rx061-Rx064, Rx071-Rx074, Rx081-Rx084, Rx091-Rx094, Rx101-Rx104, Rx111-Rx114, Rx121-Rx124, Rx131-Rx134, Rx141-Rx144, Rx151-Rx154, and Rx161-R164 of first to sixteenth rows. And the second common electrodes COM2 of the column direction include touch sensing electrodes Rx011-Rx161, Rx012-Rx162, Rx013-Rx163, and Rx014-Rx164 of first to fourth columns. Hereinafter, the touch sensing electrodes Rx011-Rx161, Rx012-Rx162, Rx013-Rx163, and Rx014-Rx164 of the first to fourth columns are referred to as first to fourth touch sensing electrodes. Each of the first to fourth touch sensing electrodes Rx011-Rx161, Rx012-Rx162, Rx013-Rx163, and Rx014-Rx164 is formed so that it corresponds to 8 unit pixel electrodes.

The first to sixteenth touch driving electrodes Tx1 to Tx16 and the touch sensing electrodes Rx011-Rx014, Rx021-Rx024, Rx031-Rx034, Rx041-Rx044, Rx051-Rx054, Rx061-Rx064, Rx071-Rx074, Rx081-Rx084, Rx091-Rx094, Rx101-Rx104, Rx111-Rx114, Rx121-Rx124, Rx131-Rx134, Rx141-Rx144, Rx151-Rx154, and Rx161-R164 of the first to sixteenth rows alternate with each other.

When the first to sixteenth touch driving electrodes Tx1 to Tx16 and the touch sensing electrodes Rx011-Rx014, Rx021-Rx024, Rx031-Rx034, Rx041-Rx044, Rx051-Rx054, Rx061-Rx064, Rx071-Rx074, Rx081-Rx084, Rx091-Rx094, Rx101-Rx104, Rx111-Rx114, Rx121-Rx124, Rx131-Rx134, Rx141-Rx144, Rx151-Rx154, and Rx161-R164 of the first to sixteenth rows of the touch sensor integrated type display device according to the first embodiment of the invention are formed of a transparent conductive material having high resistivity, such as indium tin oxide (ITO), indium zinc oxide (IZO), and gallium-doped zinc oxide (GZO), at least one resistance reducing wire selected from a metal material, such as Al, AlNd, Mo, MoTi, Cu, Cr, Ag, and an alloy thereof, may be formed on each of the touch driving electrodes and the touch sensing electrodes, so as to reduce a resistance of the electrode.

More specifically, at least one driving electrode resistance reducing wire contacting each of the first to sixteenth touch driving electrodes Tx1 to Tx16 along a longitudinal direction is formed on each of the first to sixteenth touch driving electrodes Tx1 to Tx16. In the first embodiment of the invention, for example, first to sixteenth driving electrode resistance reducing wires TxW1 to TxW16 are respectively formed on the first to sixteenth touch driving electrodes Tx1 to Tx16. At least one sensing electrode resistance reducing wire, which crosses the first to fourth touch sensing electrodes Rx011-Rx161, Rx012-Rx162, Rx013-Rx163, and Rx014-Rx164 and contacts each of them through a contact hole, is formed on each of the first to fourth touch sensing electrodes Rx011-Rx161, Rx012-Rx162, Rx013-Rx163, and Rx014-Rx164. In the first embodiment of the invention, for example, first to fourth column sensing electrode resistance reducing wires RxW11-RxW13, RxW21-RxW23, RxW31-RxW33, and RxW41-RxW43 each including three wires are respectively formed on the first to fourth touch sensing electrodes Rx011-Rx161, Rx012-Rx162, Rx013-Rx163, and Rx014-Rx164.

The first to sixteenth touch driving electrodes Tx1 to Tx16 are grouped by the first to sixteenth driving electrode resistance reducing wires TxW1 to TxW16. More specifically, the first to fourth touch driving electrodes Tx1 to Tx4 are grouped by the first to fourth driving electrode resistance reducing wires TxW1 to TxW4 and are connected to a first touch driving routing wire TW1. The fifth to eighth touch driving electrodes Tx5 to Tx8 are grouped by the fifth to eighth driving electrode resistance reducing wires TxW5 to TxW8 and are connected to a second touch driving routing wire TW2. The ninth to twelfth touch driving electrodes Tx9 to Tx12 are grouped by the ninth to twelfth driving electrode resistance reducing wires TxW9 to TxW12 and are connected to a third touch driving routing wire TW3. The thirteenth to sixteenth touch driving electrodes Tx13 to Tx16 are grouped by the thirteenth to sixteenth driving electrode resistance reducing wires TxW13 to TxW16 and are connected to a fourth touch driving routing wire TW4. The first to fourth touch driving routing wires TW1 to TW4 are respectively connected to first to fourth touch driving pads TP1 to TP4.

According to the above-described configuration, a touch driving line of a first channel is formed by the first to fourth touch driving electrodes Tx1 to Tx4, the first touch driving routing wire TW1, and the first touch driving pad TP1. A touch driving line of a second channel is formed by the fifth to eighth touch driving electrodes Tx5 to Tx8, the second touch driving routing wire TW2, and the second touch driving pad TP2. A touch driving line of a third channel is formed by the ninth to twelfth touch driving electrodes Tx9 to Tx12, the third touch driving routing wire TW3, and the third touch driving pad TP3. A touch driving line of a fourth channel is formed by the thirteenth to sixteenth touch driving electrodes Tx13 to Tx16, the fourth touch driving routing wire TW4, and the fourth touch driving pad TP4. Hence, the touch driving lines of the total 4 channels are formed.

The first to fourth touch sensing electrodes Rx011-Rx161, Rx012-Rx162, Rx013-Rx163, and Rx014-Rx164 are grouped by the first to fourth sensing electrode resistance reducing wires RxW11-RxW13, RxW21-RxW23, RxW31-RxW33, and RxW41-RxW43. More specifically, the first touch sensing electrodes Rx011-Rx161 are grouped by the first sensing electrode resistance reducing wires RxW11-RxW13 and are connected to a first touch sensing routing wire RW1. The second touch sensing electrodes Rx012-Rx162 are grouped by the second sensing electrode resistance reducing wires RxW21-RxW23 and are connected to a second touch sensing routing wire RW2. The third touch sensing electrodes Rx013-Rx163 are grouped by the third sensing electrode resistance reducing wires RxW31-RxW33 and are connected to a third touch sensing routing wire RW3. The fourth touch sensing electrodes Rx014-Rx164 are grouped by the fourth sensing electrode resistance reducing wires RxW41-RxW43 and are connected to a fourth touch sensing routing wire RW4. The first to fourth touch sensing routing wires RW1 to RW4 are respectively connected to first to fourth touch sensing pads RP1 to RP4.

According to the above-described configuration, a touch sensing line of a first channel is formed by the first touch sensing electrodes Rx011-Rx161, the first sensing electrode resistance reducing wires RxW11-RxW13, the first touch sensing routing wire RW1, and the first touch sensing pad RP1. A touch sensing line of a second channel is formed by the second touch sensing electrodes Rx012-Rx162, the second sensing electrode resistance reducing wires RxW21-RxW23, the second touch sensing routing wire RW2, and the second touch sensing pad RP2. A touch sensing line of a third channel is formed by the third touch sensing electrodes Rx013-Rx163, the third sensing electrode resistance reducing wires RxW31-RxW33, the third touch sensing routing wire RW3, and the third touch sensing pad RP3. A touch sensing line of a fourth channel is formed by the fourth touch sensing electrodes Rx014-Rx164, the fourth sensing electrode resistance reducing wires RxW41-RxW43, the fourth touch sensing routing wire RW4, and the fourth touch sensing pad RP4. As described above, because the touch driving electrodes configure the four channels and also the touch sensing electrodes configure the four channels, a total of 16 touch unit patterns are formed.

Figure 3:
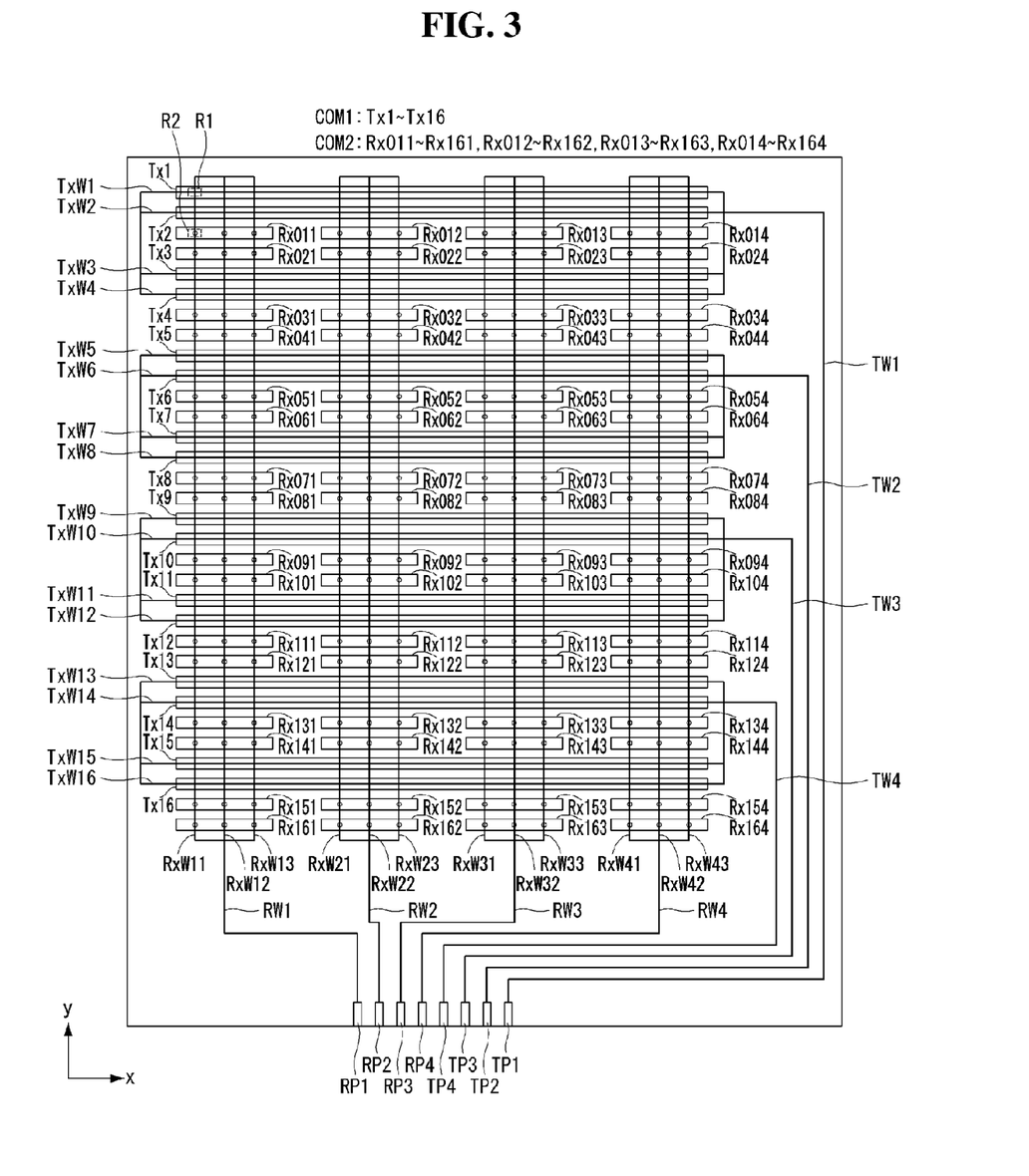
FIG. 3 is a plane view showing a relationship between touch driving electrodes and touch sensing electrodes serving as a common electrode in a touch sensor integrated type display device according to a second embodiment of the invention.

Next, a touch sensor integrated type display device according to a second embodiment of the invention is described with reference to FIG. 3. Since configuration of the touch sensor integrated type display device according to the second embodiment of the invention is substantially the same as configuration of the touch sensor integrated type display device according to the first embodiment of the invention, except that first to sixteenth touch driving electrodes Tx1 to Tx16 serving as a common electrode and touch sensing electrodes Rx011-Rx014, Rx021-Rx024, Rx031-Rx034, Rx041-Rx044, Rx051-Rx054, Rx061-Rx064, Rx071-Rx074, Rx081-Rx084, Rx091-Rx094, Rx101-Rx104, Rx111-Rx114, Rx121-Rx124, Rx131-Rx134, Rx141-Rx144, Rx151-Rx154, and Rx161-R164 serving as a common electrode of first to sixteenth rows are alternately disposed every two lines, a further description may be briefly made or may be entirely omitted.

Figure 4:
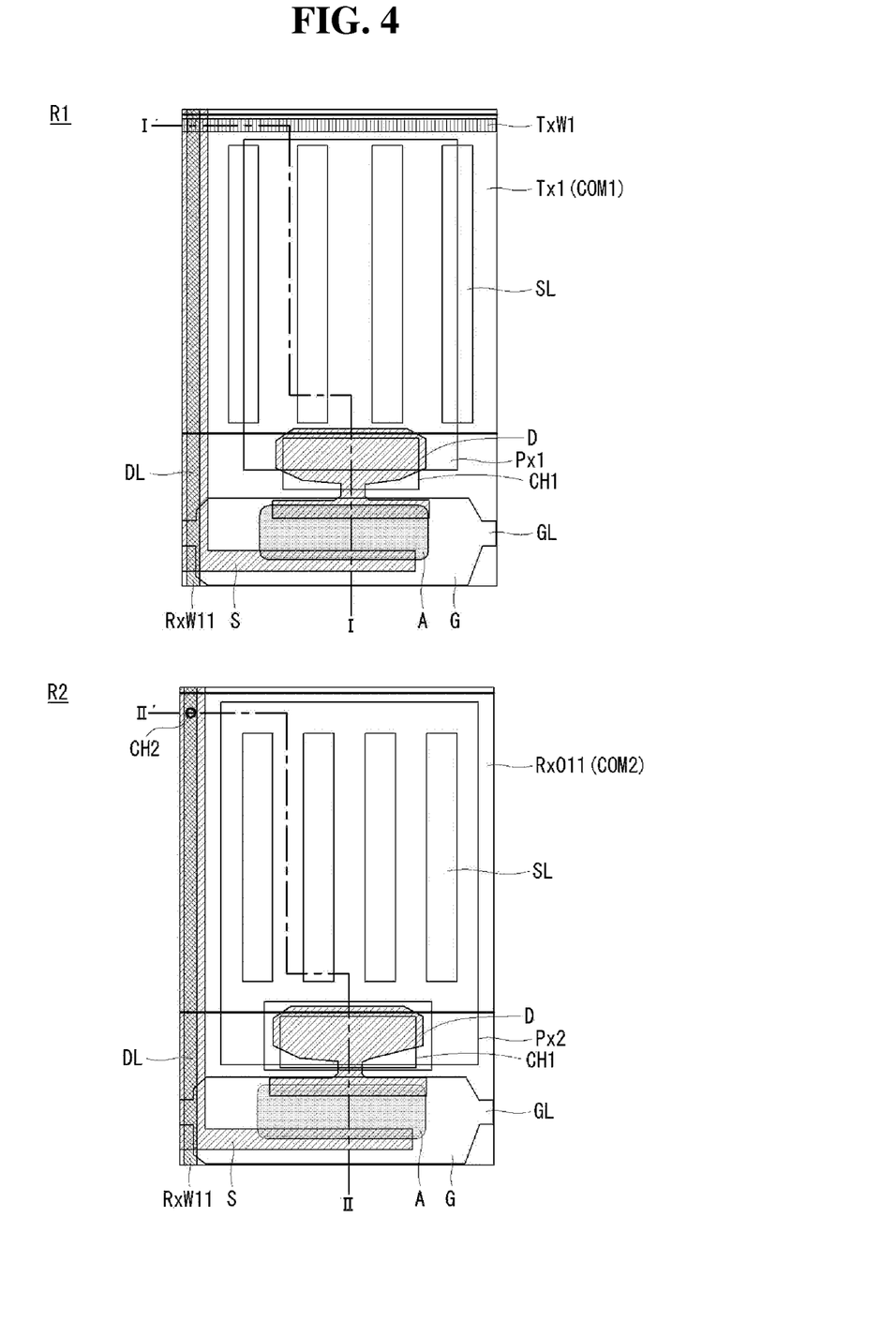
FIG. 4 is a plane view showing areas R1 and R2 shown in FIGS. 2 and 3.
Figure 5:
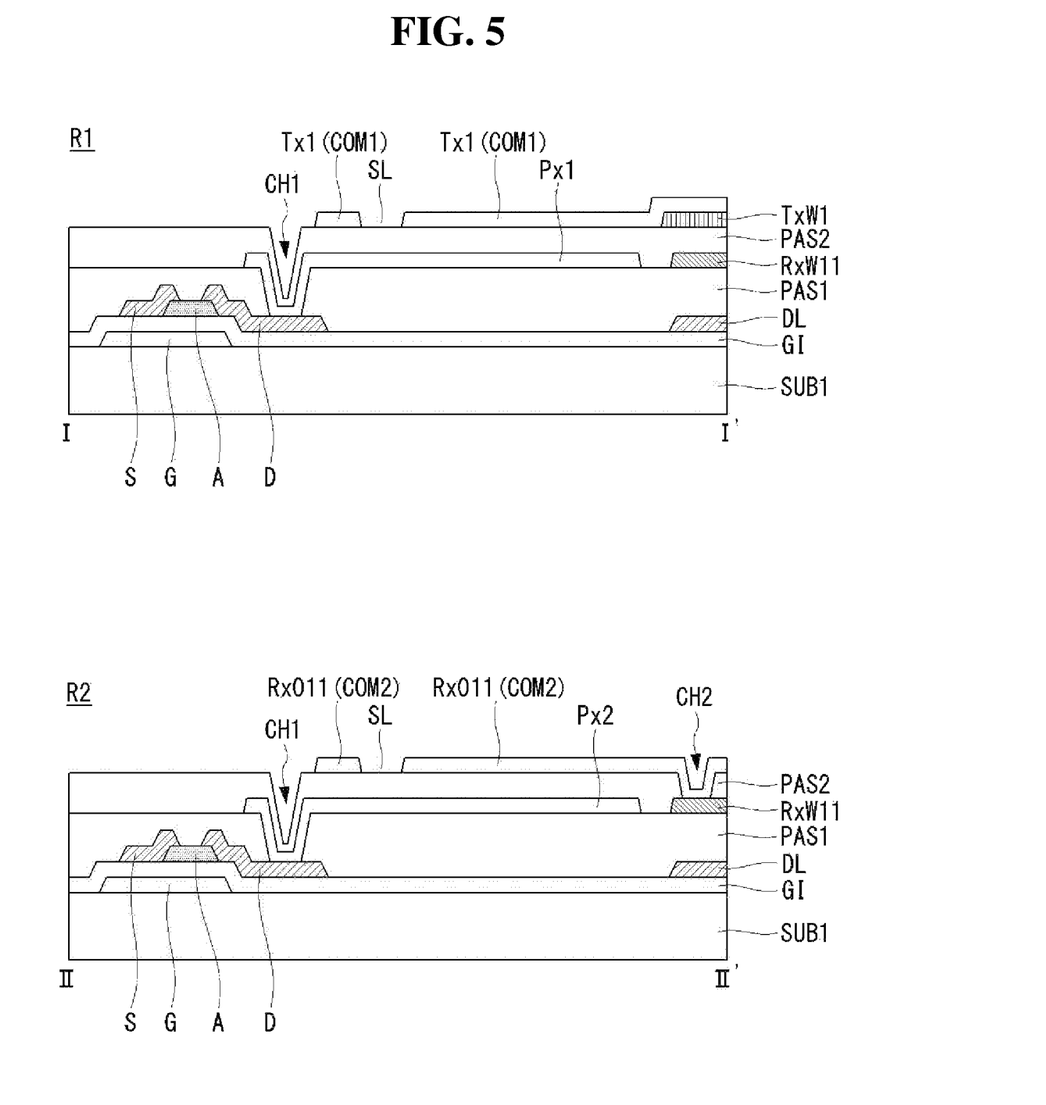
FIG. 5 is a cross-sectional view taken along lines I-I' and II-II' shown in FIG. 4.

Next, a relationship between display components and touch sensor components of the touch sensor integrated type display device according to the first and second embodiments of the invention is described in detail with reference to FIGS. 4 and 5. FIG. 4 is a plane view showing areas R1 and R2 shown in FIGS. 2 and 3. FIG. 5 is a cross-sectional view taken along lines I-I' and II-II' shown in FIG. 4. The area R1 shown in FIGS. 4 and 5 indicates one display unit pixel and a partial area of the first common electrode COM1 corresponding to the one display unit pixel, and the area R2 shown in FIGS. 4 and 5 indicates one display unit pixel and a partial area of the second common electrode COM2 corresponding to the one display unit pixel.

As shown in FIGS. 4 and 5, the first common electrode COM1 serving as the touch driving electrode of the area R1 is formed on a second passivation layer PAS2. And the first common electrode COM1 is positioned opposite a first pixel electrode (hereinafter, denoted by 'Px1' for each pixel electrode positioned opposite the first common electrode COM1) formed on a first passivation layer PAS1 covering the thin film transistor TFT. The second common electrode COM2 serving as the touch sensing electrode of the area R2 is formed on the second passivation layer PAS2. And the second common electrode COM2 is positioned opposite a second pixel electrode (hereinafter, denoted by 'Px2' for each pixel electrode positioned opposite the second common electrode COM2) formed on the first passivation layer PAS1. In other words, the first and second common electrode COM1 and COM2 are formed on the second passivation layer PAS2, and the first and second pixel electrodes Px1 and Px2 are formed on the first passivation layer PAS1.

The first and second embodiments of the invention described that the first common electrode COM1 serves as the touch driving electrode, and the second common electrode COM2 serves as the touch sensing electrode. However, it should be understood that it is merely an example. On the contrary, the first common electrode COM1 may serve as the touch sensing electrode, and the second common electrode COM2 may serve as the touch driving electrode.

Referring again to FIGS. 4 and 5, a relationship between the first and second common electrodes COM1 and COM2 and the first and second pixel electrodes Px1 and Px2 is described in detail. The thin film transistor TFT includes a gate electrode G extending from the gate line GL formed on the first substrate SUB1, an active layer A which is formed on a gate insulation layer GI covering the gate line GL and the gate electrode G at a location corresponding to the gate electrode G, a source electrode S extending from the data line DL which is formed on the first passivation layer PAS1 covering the active layer A, and a drain electrode D positioned opposite the source electrode S.

The first passivation layer PAS1 for protecting the thin film transistor TFT is formed on the first substrate SUB1, on which the thin film transistor TFT is formed. Configuration of an upper part of the first passivation layer PAS1 is dividedly described through configuration of a formation area (hereinafter, representatively indicated as the area R1) of the first common electrode COM1 serving as the touch driving electrode and configuration of a formation area (hereinafter, representatively indicated as the area R2) of the second common electrode COM2 serving as the touch sensing electrode.

The first pixel electrode Px1 is formed on the first passivation layer PAS1 of the area R1 and is connected to the drain electrode D of the thin film transistor TFT through a first contact hole CH1. Further, the sensing electrode resistance reducing wire RxW11 is formed on the first passivation layer PAS1 of the area R1 to be separated from the first pixel electrode Px1 and is positioned along the data line DL at a position overlapping the data line DL. One sensing electrode resistance reducing wire RxW11 does not need to be formed on each first pixel electrode Px1 and may be formed every several or several tens of first pixel electrodes Px1, if necessary or desired.

The second pixel electrode Px2 is formed on the first passivation layer PAS1 of the area R2 and is connected to the drain electrode D of the thin film transistor TFT through the first contact hole CH1 formed on the first passivation layer PAS1. Further, the sensing electrode resistance reducing wire RxW11 is formed on the first passivation layer PAS1 of the area R2 and extends from the area R1.

The driving electrode resistance reducing wire TxW1 is formed on the second passivation layer PAS2 of the area R1 in parallel with the gate line GL. The driving electrode resistance reducing wire TxW1 may be formed to overlap the gate line GL. As described above, when the driving electrode resistance reducing wire TxW1 is formed to overlap the gate line GL, an aperture ratio may increase.

The first common electrode COM1 serving as the touch driving electrode, which covers the driving electrode resistance reducing wire TxW1 and is positioned opposite the first pixel electrode Px1, is formed on the second passivation layer PAS2 of the area R1, on which the driving electrode resistance reducing wire TxW1 is formed.

The second common electrode COM2 serving as the touch sensing electrode, which is positioned opposite the second pixel electrode Px2 formed on the first passivation layer PAS1, is formed on the second passivation layer PAS2 of the area R2. The second common electrode COM2 serving as the touch sensing electrode is connected to the sensing electrode resistance reducing wire RxW11 through a second contact hole CH2 formed on the second passivation layer PAS2.

In the touch sensor integrated type display device according to the first and second embodiments of the invention, the first common electrode COM1 serving as the touch driving electrode and the second common electrode COM2 serving as the touch sensing electrode formed on the second passivation layer PAS2 of the areas R1 and R2 each have a plurality of slits SL.

Figure 6:
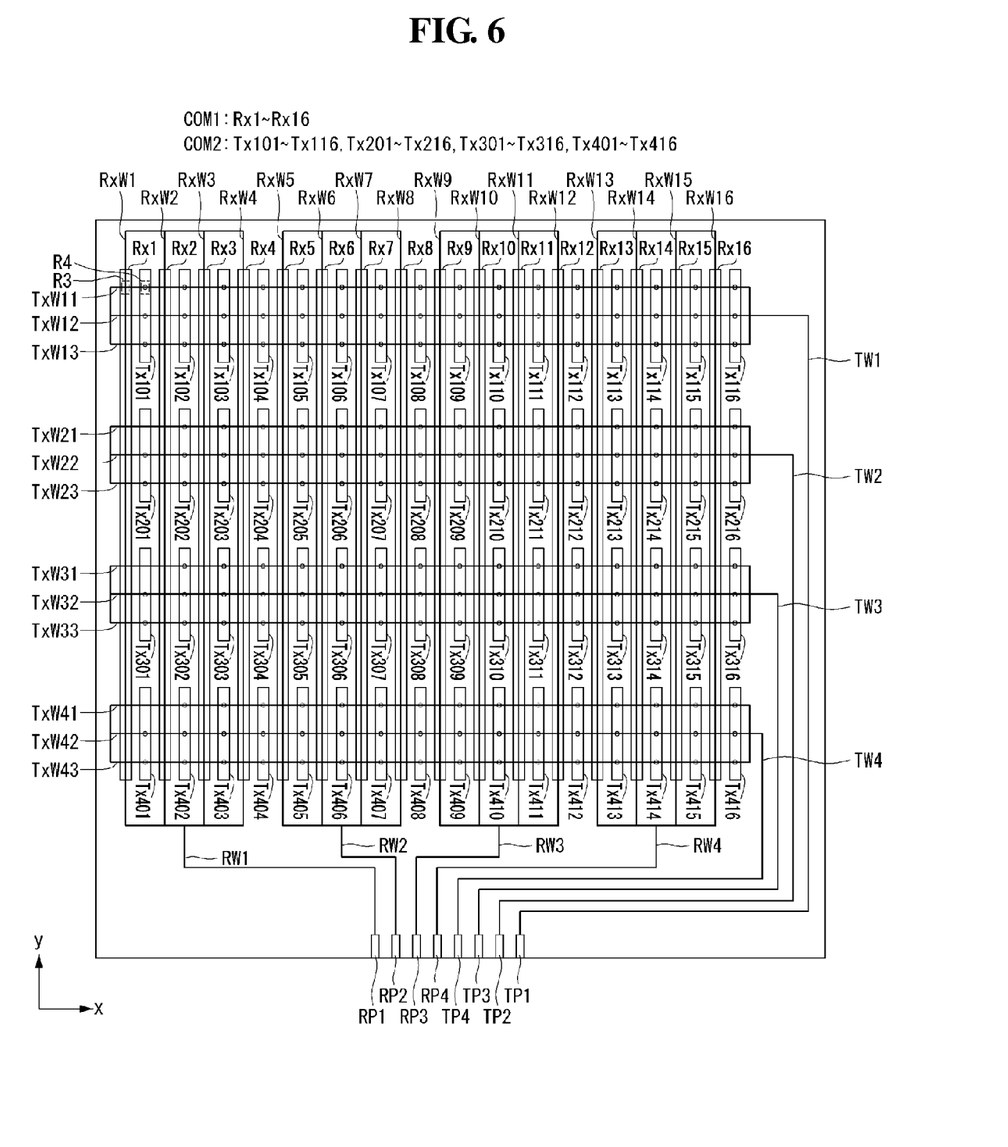
FIG. 6 is a plane view showing a relationship between touch driving electrodes serving as a common electrode and touch sensing electrodes serving as a common electrode in a touch sensor integrated type display device according to a third embodiment of the invention.

Next, a touch sensor integrated type display device according to a third embodiment of the invention is described with reference to FIG. 6. FIG. 6 is a plane view showing a relationship between touch driving electrodes serving as a common electrode and touch sensing electrodes serving as a common electrode in a touch sensor integrated type display device according to a third embodiment of the invention.

Referring to FIG. 6, the common electrode according to the third embodiment of the invention is divided into the plurality of common electrodes and serves as a touch driving electrode and a touch sensing electrode. Thus, in the following description, the common electrode is referred to as the common electrode serving as the touch driving electrode, the common electrode serving as the touch sensing electrode, the touch driving electrode, the touch sensing electrode, the touch driving electrode serving as the common electrode, or the touch sensing electrode serving as the common electrode, if necessary or desired.

The touch sensor integrated type display device according to the third embodiment of the invention is described using a display pixel including 32 unit pixel electrodes in a x-axis direction and 32 unit pixel electrodes in a y-axis direction as an example, in the same manner as the touch sensor integrated type display device according to the first and second embodiments of the invention.

As shown in FIG. 6, the common electrode of the touch sensor integrated type display device according to the third embodiment of the invention is divided in a first direction (for example, x-axis direction) and a second direction (for example, y-axis direction). More specifically, the common electrode is divided in the x-axis and y-axis directions to include a plurality of first common electrodes COM1 arranged along the y-axis direction and a plurality of second common electrodes COM2 arranged along the x-axis and y-axis directions.

The first common electrodes COM1 serve as touch sensing electrodes of touch sensors and form a plurality of touch sensing lines in the y-axis direction. The touch sensing lines defined by the first common electrodes COM1 are formed in parallel with one another so as to form a plurality of rows. Hereinafter, the touch sensing lines are referred to as first to sixteenth touch sensing electrodes Rx1 to Rx16. Each of the first to sixteenth touch sensing electrodes Rx1 to Rx16 is formed so that it corresponds to 32 unit pixel electrodes.

The second common electrodes COM2 serve as touch driving electrodes of the touch sensors and form a plurality of touch driving lines in the x-axis direction. The touch driving lines defined by the second common electrodes COM2 are divided in the x-axis and y-axis directions so that the touch driving lines are formed in the x-axis direction, and thus are formed in parallel with one another so as to form the rows and the columns. Thus, the second common electrodes COM2 are divided in both the x-axis direction (i.e., row direction) and the y-axis direction (i.e., column direction). Hence, the second common electrodes COM2 of the row direction include touch driving electrodes Tx101-Tx116, Tx201-Tx216, Tx301-Tx316, and Tx401-Tx416 of first to fourth rows. And the second common electrodes COM2 of the column direction include touch driving electrodes Tx101-Tx401, Tx102-Tx402, Tx103-Tx403, Tx104-Tx404, Tx105-Tx405, Tx106-Tx406, Tx107-Tx407, Tx108-Tx408, Tx109-Tx409, Tx110-Tx410, Tx111-Tx411, Tx112-Tx412, Tx113-Tx413, Tx114-Tx414, Tx115-Tx415, and Tx116-Tx416 of first to sixteenth columns. Hereinafter, the touch driving electrodes Tx101-Tx116, Tx201-Tx216, Tx301-Tx316, and Tx401-Tx416 of the first to fourth rows are referred to as first to fourth touch driving electrodes. Each of the first to fourth touch driving electrodes Tx101-Tx116, Tx201-Tx216, Tx301-Tx316, and Tx401-Tx416 is formed so that it corresponds to 8 unit pixel electrodes.

The first to sixteenth touch sensing electrodes Rx1 to Rx16 and the touch driving electrodes Tx101-Tx401, Tx102-Tx402, Tx103-Tx403, Tx104-Tx404, Tx105-Tx405, Tx106-Tx406, Tx107-Tx407, Tx108-Tx408, Tx109-Tx409, Tx110-Tx410, Tx111-Tx411, Tx112-Tx412, Tx113-Tx413, Tx114-Tx414, Tx115-Tx415, and Tx116-Tx416 of the first to sixteenth columns alternate with each other.

When the first to sixteenth touch sensing electrodes Rx1 to Rx16 and the touch driving electrodes Tx101-Tx401, Tx102-Tx402, Tx103-Tx403, Tx104-Tx404, Tx105-Tx405, Tx106-Tx406, Tx107-Tx407, Tx108-Tx408, Tx109-Tx409, Tx110-Tx410, Tx111-Tx411, Tx112-Tx412, Tx113-Tx413, Tx114-Tx414, Tx115-Tx415, and Tx116-Tx416 of the first to sixteenth columns in the touch sensor integrated type display device according to the third embodiment of the invention are formed of a transparent conductive material having high resistivity, such as indium tin oxide (ITO), indium zinc oxide (IZO), and gallium-doped zinc oxide (GZO), at least one resistance reducing wire selected from a metal material, such as Al, AlNd, Mo, MoTi, Cu, Cr, Ag, and an alloy thereof, may be formed on each of the touch sensing electrodes and the touch driving electrodes, so as to reduce a resistance of the electrode.

More specifically, at least one sensing electrode resistance reducing wire contacting the first to sixteenth touch sensing electrodes Rx1 to Rx16 along a longitudinal direction is formed on each of the first to sixteenth touch sensing electrodes Rx1 to Rx16. In the third embodiment of the invention, for example, first to sixteenth sensing electrode resistance reducing wires RxW1 to RxW16 are respectively formed on the first to sixteenth touch sensing electrodes Rx1 to Rx16. At least one driving electrode resistance reducing wire, which crosses the first to fourth touch driving electrodes Tx101-Tx116, Tx201-Tx216, Tx301-Tx316, and Tx401-Tx416 and contacts them through a contact hole, is formed on each of the first to fourth touch driving electrodes Tx101-Tx116, Tx201-Tx216, Tx301-Tx316, and Tx401-Tx416. In the third embodiment of the invention, for example, first to fourth driving electrode resistance reducing wires TxW11-TxW13, TxW21-TxW23, TxW31-TxW33, and TxW41-TxW43 each including three wires are respectively formed on the first to fourth touch driving electrodes Tx101-Tx116, Tx201-Tx216, Tx301-Tx316, and Tx401-Tx416.

The first to sixteenth touch sensing electrodes Rx1 to Rx16 are grouped by the first to sixteenth sensing electrode resistance reducing wires RxW1 to RxW16. More specifically, the first to fourth touch sensing electrodes Rx1 to Rx4 are grouped by the first to fourth sensing electrode resistance reducing wires RxW1 to RxW4 and are connected to a first touch sensing routing wire RW1. The fifth to eighth touch sensing electrodes Rx5 to Rx8 are grouped by the fifth to eighth sensing electrode resistance reducing wires RxW5 to RxW8 and are connected to a second touch sensing routing wire RW2. The ninth to twelfth touch sensing electrodes Rx9 to Rx12 are grouped by the ninth to twelfth sensing electrode resistance reducing wires RxW9 to RxW12 and are connected to a third touch sensing routing wire RW3. The thirteenth to sixteenth touch sensing electrodes Rx13 to Rx16 are grouped by the thirteenth to sixteenth sensing electrode resistance reducing wires RxW13 to RxW16 and are connected to a fourth touch sensing routing wire RW4. The first to fourth touch sensing routing wires RW1 to RW4 are respectively connected to first to fourth touch sensing pads RP1 to RP4.

According to the above-described configuration, a touch sensing line of a first channel is formed by the first to fourth touch sensing electrodes Rx1 to Rx4, the first touch sensing routing wire RW1, and the first touch sensing pad RP1. A touch sensing line of a second channel is formed by the fifth to eighth touch sensing electrodes Rx5 to Rx8, the second touch sensing routing wire RW2, and the second touch sensing pad RP2. A touch sensing line of a third channel is formed by the ninth to twelfth touch sensing electrodes Rx9 to Rx12, the third touch sensing routing wire RW3, and the third touch sensing pad RP3. A touch sensing line of a fourth channel is formed by the thirteenth to sixteenth touch sensing electrodes Rx13 to Rx16, the fourth touch sensing routing wire RW4, and the fourth touch sensing pad RP4. Hence, the touch sensing lines of the total of 4 channels are formed.

The first to fourth touch driving electrodes Tx101-Tx116, Tx201-Tx216, Tx301-Tx316, and Tx401-Tx416 are grouped by the first to fourth driving electrode resistance reducing wires TxW11-TxW13, TxW21-TxW23, TxW31-TxW33, and TxW41-TxW43. More specifically, the first touch driving electrodes Tx101-Tx116 are grouped by the first driving electrode resistance reducing wires TxW11-TxW13 and are connected to a first touch driving routing wire TW1. The second touch driving electrodes Tx201-Tx216 are grouped by the second driving electrode resistance reducing wires TxW21-TxW23 and are connected to a second touch driving routing wire TW2. The third touch driving electrodes Tx301-Tx316 are grouped by the third driving electrode resistance reducing wires TxW31-TxW33 and are connected to a third touch driving routing wire TW3. And the fourth touch driving electrodes Tx401-Tx416 are grouped by the fourth driving electrode resistance reducing wires TxW41-TxW43 and are connected to a fourth touch driving routing wire TW4. The first to fourth touch driving routing wires TW1 to TW4 are respectively connected to first to fourth touch driving pads TP1 to TP4.

According to the above-described configuration, a touch driving line of a first channel is formed by the first touch driving electrodes Tx101-Tx116, the first driving electrode resistance reducing wires TxW11-TxW13, the first touch driving routing wire TW1, and the first touch driving pad TP1. A touch driving line of a second channel is formed by the second touch driving electrodes Tx201-Tx216, the second driving electrode resistance reducing wires TxW21-TxW23, the second touch driving routing wire TW2, and the second touch driving pad TP2. A touch driving line of a third channel is formed by the third touch driving electrodes Tx301-Tx316, the third driving electrode resistance reducing wires TxW31-TxW33, the third touch driving routing wire TW3, and the third touch driving pad TP3. And a touch driving line of a fourth channel is formed by the fourth touch driving electrodes Tx401-Tx416, the fourth driving electrode resistance reducing wires TxW41-TxW43, the fourth touch driving routing wire TW4, and the fourth touch driving pad TP4. As described above, because the touch sensing electrodes configure the four channels and also the touch driving electrodes configure the four channels, a total of 16 touch unit patterns are formed.

Figure 7:
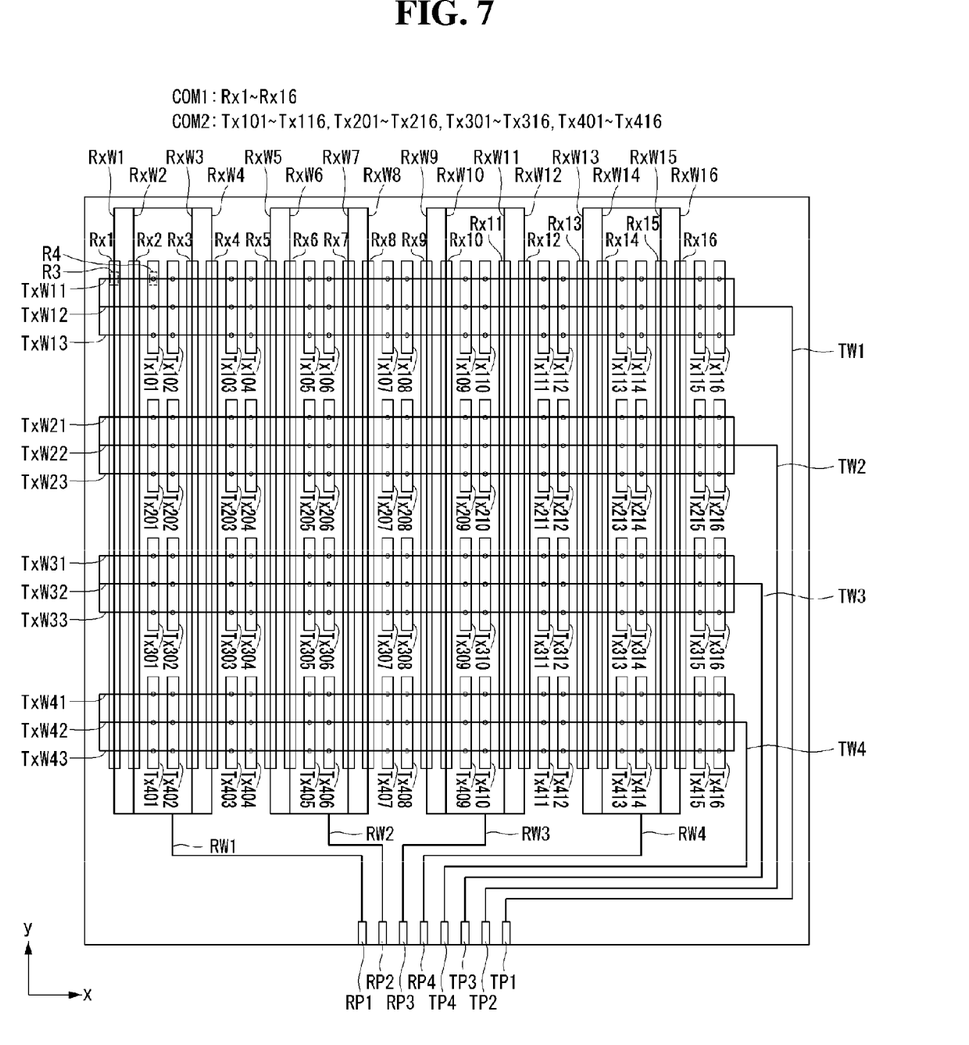
FIG. 7 is a plane view showing a relationship between touch driving electrodes serving as a common electrode and touch sensing electrodes in a touch sensor integrated type display device according to a fourth embodiment of the invention.

Next, a touch sensor integrated type display device according to a fourth embodiment of the invention is described with reference to FIG. 7. Since configuration of the touch sensor integrated type display device according to the fourth embodiment of the invention is substantially the same as configuration of the touch sensor integrated type display device according to the first embodiment of the invention, except that first to sixteenth touch sensing electrodes Rx1 to Rx16 serving as a common electrode and touch driving electrodes Tx101-Tx401, Tx102-Tx402, Tx103-Tx403, Tx104-Tx404, Tx105-Tx405, Tx106-Tx406, Tx107-Tx407, Tx108-Tx408, Tx109-Tx409, Tx110-Tx410, Tx111-Tx411, Tx112-Tx412, Tx113-Tx413, Tx114-Tx414, Tx115-Tx415, and Tx116-Tx416 serving as a common electrode of first to sixteenth columns are alternately disposed every two lines, a further description may be briefly made or may be entirely omitted.

Figure 8:
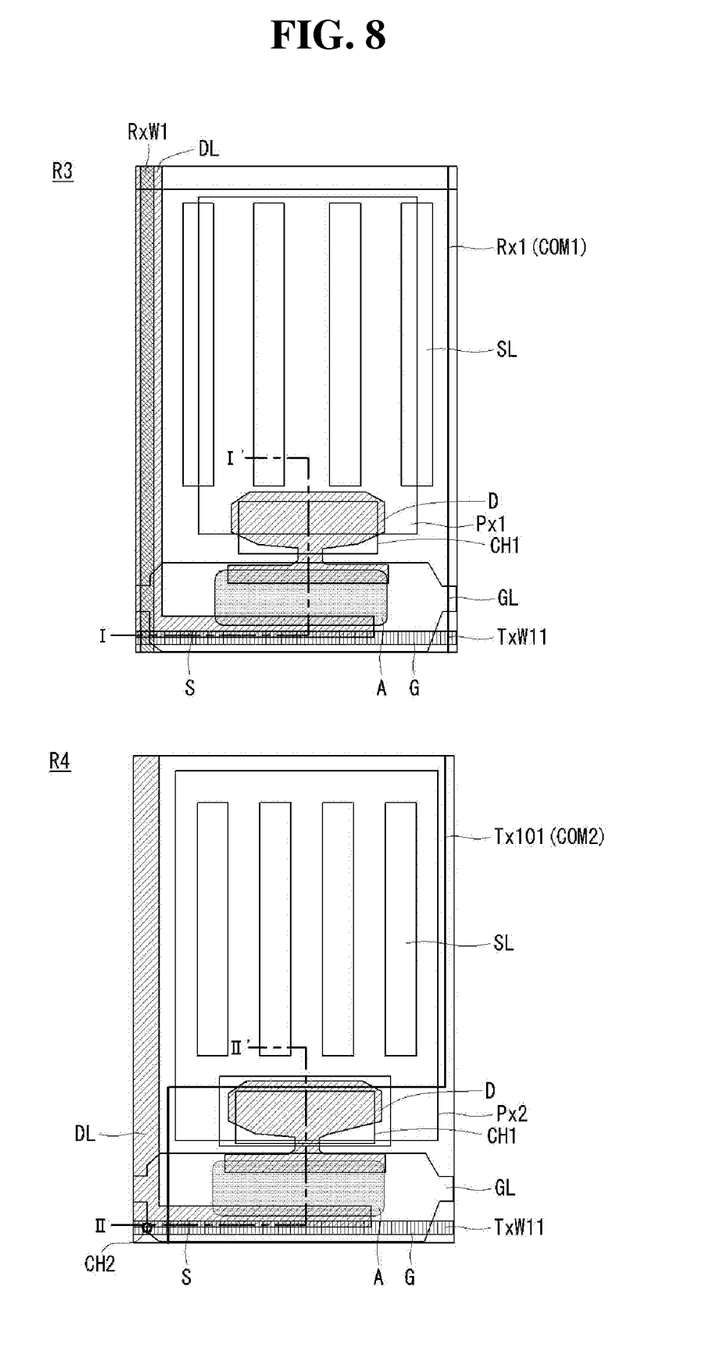
FIG. 8 is a plane view showing areas R3 and R4 shown in FIGS. 6 and 7.
Figure 9:
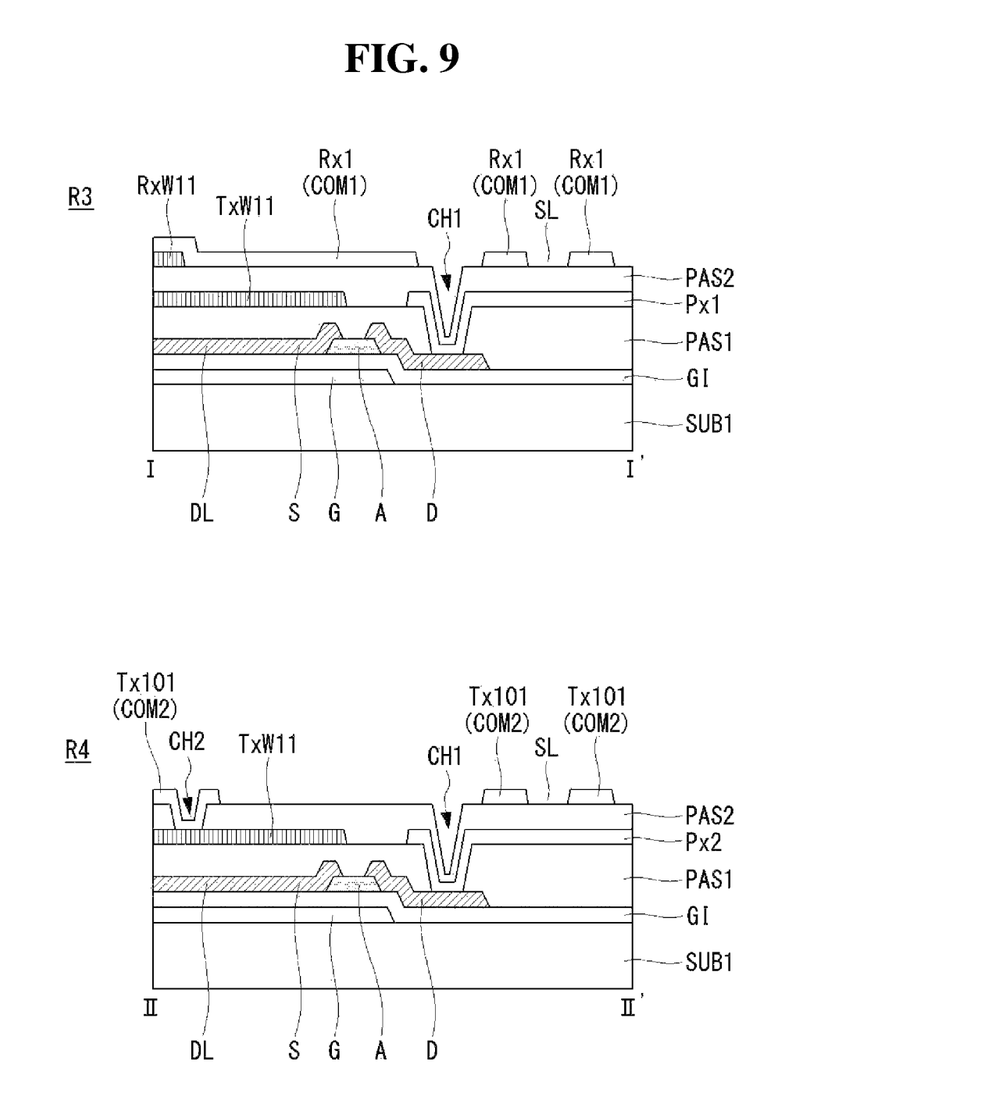
FIG. 9 is a cross-sectional view taken along lines I-I' and II-II' shown in FIG. 8.

Next, a relationship between display components and touch sensor components of the touch sensor integrated type display device according to the third and fourth embodiments of the invention is described in detail with reference to FIGS. 8 and 9. FIG. 8 is a plane view showing areas R3 and R4 shown in FIGS. 6 and 7. FIG. 9 is a cross-sectional view taken along lines I-I' and II-II' shown in FIG. 8. The area R3 shown in FIGS. 8 and 9 indicates one display unit pixel and a partial area of the first common electrode COM1 corresponding to the one display unit pixel, and the area R4 shown in FIGS. 8 and 9 indicates one display unit pixel and a partial area of the second common electrode COM2 corresponding to the one display unit pixel.

As shown in FIGS. 8 and 9, the first common electrode COM1 serving as the touch sensing electrode of the area R3 is formed on a second passivation layer PAS2 and is positioned opposite a first pixel electrode (hereinafter, denoted by 'Px1' for each pixel electrode positioned opposite the first common electrode COM1) formed on a first passivation layer PAS1 covering the thin film transistor TFT. The second common electrode COM2 serving as the touch driving electrode of the area R4 is formed on the first passivation layer PAS1 and is positioned opposite a second pixel electrode (hereinafter, denoted by 'Px2' for each pixel electrode positioned opposite the second common electrode COM2) formed on the first passivation layer PAS1. In other words, the first common electrode COM1 serving as the touch sensing electrode is formed on the second passivation layer PAS2 of the area R3, and the second common electrode COM2 serving as the touch driving electrode is formed on the second passivation layer PAS2 of the area R4.

The third and fourth embodiments of the invention described that the first common electrode COM1 serves as the touch sensing electrode, and the second common electrode COM2 serves as the touch driving electrode. However, it should be understood that it is merely an example. On the contrary, the first common electrode COM1 may serve as the touch driving electrode, and the second common electrode COM2 may serve as the touch sensing electrode.

Referring again to FIGS. 8 and 9, a relationship between the first and second common electrodes COM1 and COM2 and the first and second pixel electrodes Px1 and Px2 is described in detail. The thin film transistor TFT includes a gate electrode G extending from the gate line GL formed on the first substrate SUB1, an active layer A which is formed on a gate insulation layer GI covering the gate line GL and the gate electrode G at a location corresponding to the gate electrode G, a source electrode S extending from the data line DL which is formed on the first passivation layer PAS1 covering the active layer A, and a drain electrode D positioned opposite the source electrode S.

The first passivation layer PAS1 for protecting the thin film transistor TFT is formed on the first substrate SUB1, on which the thin film transistor TFT is formed. Configuration of an upper part of the first passivation layer PAS1 is dividedly described through configuration of a formation area (hereinafter, representatively indicated as the area R3) of the first common electrode COM1 serving as the touch sensing electrode and configuration of a formation area (hereinafter, representatively indicated as the area R4) of the second common electrode COM2 serving as the touch driving electrode.

The first pixel electrode Px1 is formed on the first passivation layer PAS1 of the area R3 and is connected to the drain electrode D of the thin film transistor TFT through a first contact hole CH1. Further, the driving electrode resistance reducing wire TxW11 is formed on the first passivation layer PAS1 of the area R3 to be separated from the first pixel electrode Px1 and is positioned along the gate line GL at a position overlapping the gate line GL. One driving electrode resistance reducing wire TxW11 does not need to be formed on each first pixel electrode Px1 and may be formed every several or several tens of first pixel electrodes Px1, if necessary or desired.

The second pixel electrode Px2 is formed on the first passivation layer PAS1 of the area R4 and is connected to the drain electrode D of the thin film transistor TFT through the first contact hole CH1 formed on the first passivation layer PAS1. Further, the driving electrode resistance reducing wire TxW11 is formed on the first passivation layer PAS1 of the area R4 and extends from the area R3.

The sensing electrode resistance reducing wire RxW1 positioned in parallel with the gate line GL and the first common electrode COM1 serving as the touch sensing electrode covering the sensing electrode resistance reducing wire RxW1 are formed on the second passivation layer PAS2 of the area R3. The sensing electrode resistance reducing wire RxW1 is formed to overlap the gate line GL. As described above, when the sensing electrode resistance reducing wire RxW1 is formed to overlap the gate line GL, an aperture ratio may increase.

The second common electrode COM2 serving as the touch driving electrode, which is positioned opposite the second pixel electrode Px2 formed on the first passivation layer PAS1, is formed on the second passivation layer PAS2 of the area R4. The second common electrode COM2 serving as the touch driving electrode is connected to the driving electrode resistance reducing wire TxW11 through a second contact hole CH2 formed on the second passivation layer PAS2.

In the touch sensor integrated type display device according to the third and fourth embodiments of the invention, the first common electrode COM1 serving as the touch sensing electrode and the second common electrode COM2 serving as the touch driving electrode formed on the second passivation layer PAS2 of the areas R3 and R4 each have a plurality of slits SL. However, on the contrary, if one of the common electrode and the pixel electrode, which are opposite to each other, has slots, the other may have no slit.

As described above, in the touch sensor integrated type display device according to the first to fourth embodiments of the invention, the display unit pixel includes 32 pixels in the x-axis direction and 32 pixels in the y-axis direction, and the common electrode is properly divided to form 16 touch unit patterns. However, it is merely an example for the sake of brevity and ease of reading, and the embodiments of the invention are not limited thereto. The size of the display unit pixel may be changed depending on the size of the display device.

Furthermore, each row in the touch sensing electrodes of the first to sixteenth rows is composed of the four first common electrodes in the first and second embodiments of the invention, and each column in the touch driving electrodes of the first to sixteenth columns is composed of the four second common electrodes in the third and fourth embodiments of the invention. However, it is merely an example for the sake of brevity and ease of reading, and the embodiments of the invention are not limited thereto. The number of touch sensing electrodes on each row or column and the number of touch driving electrodes on each column or row may be changed, if necessary or desired.

Furthermore, in the first and second embodiments of the invention, the touch sensing electrodes of the first to sixteenth rows and the first to sixteenth touch driving electrodes are alternately disposed every one line or every two lines. However, it is merely an example for the sake of brevity and ease of reading, and the embodiments of the invention are not limited thereto. For example, they may be alternately disposed every three or more lines. In the third and fourth embodiments of the invention, the touch driving electrodes of the first to sixteenth columns and the first to sixteenth touch sensing electrodes are alternately disposed every one line or every two lines. However, it is merely an example for the sake of brevity and ease of reading, and the embodiments of the invention are not limited thereto. For example, they may be alternately disposed every three or more lines.

Furthermore, the number of driving electrode resistance reducing wires and the number of sensing electrode resistance reducing wires described in the first to fourth embodiments of the invention are merely an example for the sake of brevity and ease of reading, and the embodiments of the invention are not limited thereto. The number of driving electrode resistance reducing wires and the number of sensing electrode resistance reducing wires may be properly selected, if necessary or desired.

Furthermore, in the first to fourth embodiments of the invention, the first and second pixel electrodes are formed on the first passivation layer, and the first and second common electrodes are formed on the second passivation layer. However, on the contrary, the first and second pixel electrodes may be formed on the second passivation layer, and the first and second common electrodes may be formed on the first passivation layer.

Furthermore, in the first to fourth embodiments of the invention, the touch driving line channels and the touch sensing line channels are formed using the driving electrode resistance reducing wires and the sensing electrode resistance reducing wires. However, it is merely an example for the sake of brevity and ease of reading, and the embodiments of the invention are not limited thereto. For example, the touch driving electrodes and the touch sensing electrodes may be connected to the touch driving routing wires and the touch sensing routing wires by properly grouping the touch driving electrodes and the touch sensing electrodes using the driving electrode resistance reducing wires and the sensing electrode resistance reducing wires, thereby forming the touch unit patterns having the desired size.

As described above, in the touch sensor integrated type display device according to the embodiments of the invention, the touch driving electrodes and the touch sensing electrodes are connected to the common electrodes of the same number of display pixels and are alternately disposed. Hence, a difference between mutual capacitances before and after the touch operation may be maximized, and a touch performance may be improved. Furthermore, the display pixels may be regularly and simply configured, and the touch driving electrodes and the touch driving electrodes may be easily grouped.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display device comprising:
    a plurality of gate lines and a plurality of data lines configured to cross each other and form a plurality of pixel areas;
    a plurality of first electrodes arranged in parallel with one another in a first direction;
    a plurality of second electrodes which are formed on the same layer as the plurality of first electrodes and are arranged in parallel with one another in the first direction and a second direction crossing the first direction;
    a plurality of pixel electrodes which are formed on a layer different from the plurality of first and second electrodes in the plurality of pixel areas and are positioned opposite the plurality of first and second electrodes; and
    at least one second electrode resistance reducing wire formed on the same layer as the plurality of pixel electrodes and connecting second electrodes belonging to one line of the plurality of second electrodes arranged in the second direction,
    wherein the plurality of first electrodes and the plurality of second electrodes arranged in parallel with one another in the first direction are alternately disposed every m electrode lines, where m is a natural number.

2. The touch sensor integrated type display device of claim 1, wherein each of the plurality of first electrodes is formed to correspond to the pixel electrodes corresponding to one line arranged in the first direction,
    wherein the plurality of second electrodes arranged in parallel with one another in the first direction are formed to correspond to the pixel electrodes corresponding to one line arranged in the first direction.

3. The touch sensor integrated type display device of claim 1, further comprising at least one first electrode resistance reducing wire configured to overlap the first electrode along a direction of the first electrode and reduce a resistance of the first electrode.

4. The touch sensor integrated type display device of claim 3, wherein the at least one second electrode resistance reducing wire is disposed to cross the at least one first electrode resistance reducing wire, and reduces a resistance of the second electrodes.

5. The touch sensor integrated type display device of claim 1, wherein the plurality of first electrodes serve as both common electrodes and touch driving electrodes, and the plurality of second electrodes serve as both common electrodes and touch sensing electrodes.

6. The touch sensor integrated type display device of claim 1, wherein the plurality of first electrodes serve as both common electrodes and touch sensing electrodes, and the plurality of second electrodes serve as both common electrodes and touch driving electrodes.

7. The touch sensor integrated type display device of claim 1, wherein the plurality of first electrodes includes at least one pair of first electrodes disposed adjacent to each other without having the second electrodes between the at least one pair of first electrodes.

8. The touch sensor integrated type display device of claim 1, wherein the plurality of first electrodes includes a plurality of pairs of first electrodes, each pair of first electrodes are disposed adjacent to each other without having the second electrodes between the pair of first electrodes, and second electrodes belonging to at least two lines of the plurality of second electrodes arranged in the second direction are disposed between one pair of first electrodes and another pair of first electrodes.

* * * * *